April 5, 1966     E. R. HILSON     3,243,927
REINFORCED CONCRETE MEMBERS AND
FOOTING SUPPORTS THEREFOR
Filed April 4, 1963     3 Sheets-Sheet 1
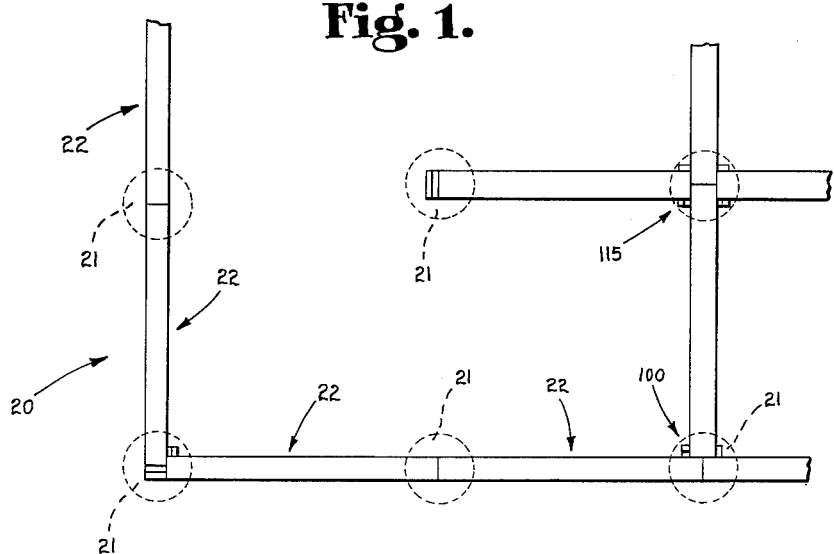
Fig. 1.
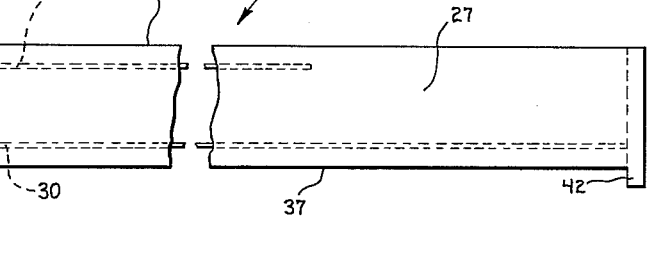
Fig. 2.
Fig. 4.
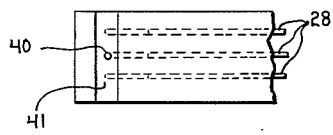
Fig. 3.
INVENTOR.
EUGENE R. HILSON
BY
*Lockwood, Woodard, Smith & Weikart*
Attorneys April 5, 1966 E. R. HILSON 3,243,927
REINFORCED CONCRETE MEMBERS AND
FOOTING SUPPORTS THEREFOR
Filed April 4, 1963 3 Sheets-Sheet 2

INVENTOR.
EUGENE R. HILSON
BY
Lockwood, Woodard, Smith & Weikart
Attorneys

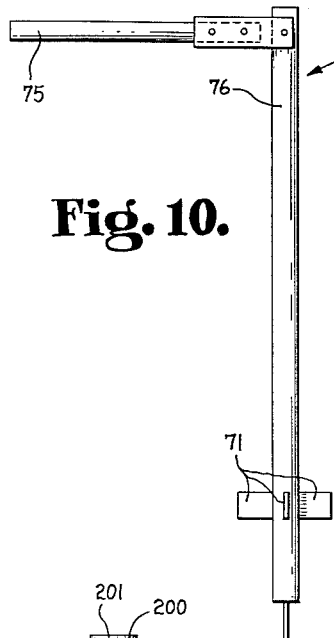
Fig. 10.
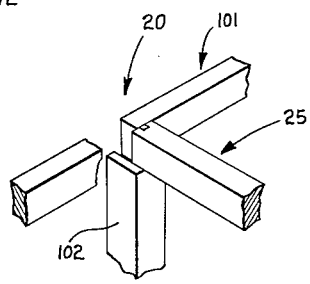
Fig. 11.
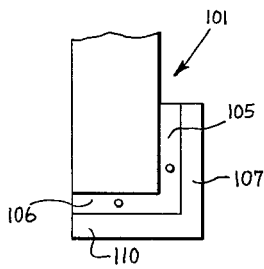
Fig. 12.
Fig. 13.
Fig. 14.
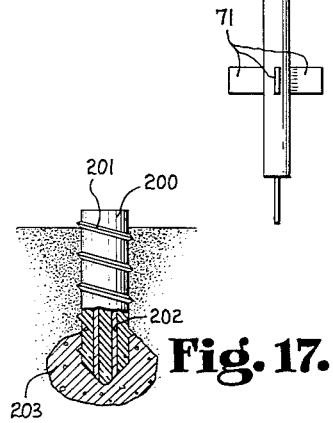
Fig. 17.
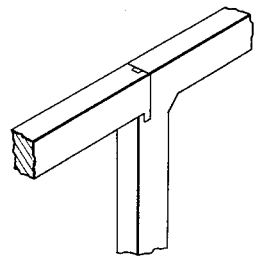
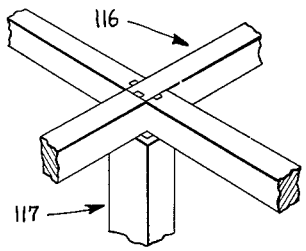
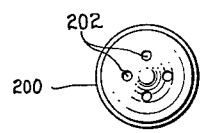
Fig. 18.
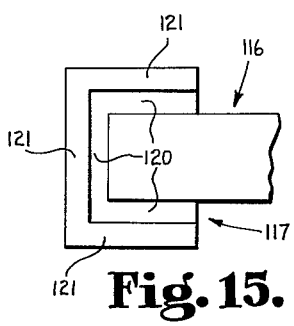
Fig. 15.
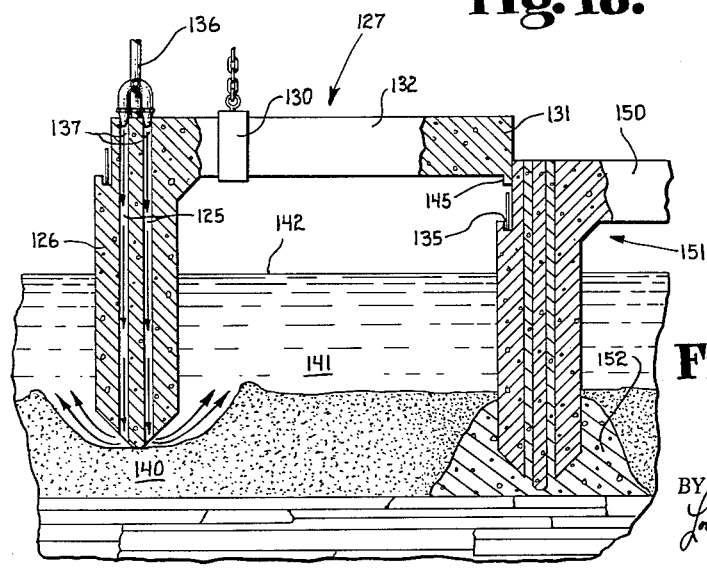
Fig. 16.
INVENTOR.
EUGENE R. HILSON United States Patent Office 3,243,927
Patented Apr. 5, 1966

3,243,927
REINFORCED CONCRETE MEMBERS AND
FOOTING SUPPORTS THEREFOR
Eugene R. Hilson, 8820 Pendleton Pike,
Indianapolis, Ind.
Filed Apr. 4, 1963, Ser. No. 270,609
1 Claim. (Cl. 52—169)

The present invention relates to an improved building construction.

In the northern part of the country, the winter usually appreciably interferes with the construction of homes and similar buildings partly because of the difficulty of penetrating the frozen ground to construct the building foundation. One object of the present invention is to provide a building construction which eliminates the necessity of digging through a large amount of ground to construct a foundation yet which provides a foundation which is fully as firm and strong as a standard foundation and which has the appearance of a standard foundation.

Still another object of the present invention is to provide a building construction which permits rapid assembly of a strong, sturdy building possibly many floors in height, using the same basic system of angle joists and tie lintels.

A further object of the present invention is to provide an improved building construction member which functions as a foundation post as well as a lintel or beam.

Another more particular object of the present invention is to provide improved footing construction.

Still another object of the invention is to provide an improved method of installing a foundation with footings under water.

A further object of the invention is to provide improved method and means for installing a foundation in relatively fluid or shifting ground.

Related objects and advantages will become apparent as the description proceeds.

One embodiment of the building construction of the present invention includes a plurality of concrete footing discs each submerged beneath the ground and having an upwardly facing flat surface. A plurality of L-shaped reinforced concrete members are provided each functioning not only as a post of the foundation but also as a lintel or beam. Each of the L-shaped members has one leg vertical and resting on the flat surface of a respective footing disc and has its other leg horizontal with the distal end of the horizontal leg supported upon the vertical post portion of an adjacent L-shaped member.

The full nature of the invention will be understood from the acompanying drawings and the following description and claim.

FIG. 1 is a top plan view of a foundation constructed according to the present invention.

FIG. 2 is a side elevation of an L-shaped member used in the foundation of FIG. 1.

FIG. 3 is a fragmentary top plan view of the structure of FIG. 2.

FIG. 4 is a view similar to FIG. 3 of a different portion of the structure of FIG. 2.

FIG. 10 is a side elevation of a tool usable in setting the footings of FIGS. 6–9.

FIG. 11 is a perspective view showing in detail one of the intersections or junctions of members illustrated in FIG. 1.

FIG. 12 is a fragmentary top plan view of one of the members of FIG. 11.

FIG. 13 is a perspective view showing a typical intersection of members of FIG. 1.

FIG. 14 is a perspective view similar to FIGS. 11 and 13 and showing a four-way intersection of members as illustrated in FIG. 1.

FIG. 15 is a fragmentary top plan view of one of the members illustrated in FIG. 14.

FIG. 16 is a vertical section showing certain steps in the process embodied in applicant's invention.

FIG. 17 illustrates an alternative footing including within the present invention.

FIG. 18 is a bottom plan view of the footing of FIG. 17.

Figure 5:
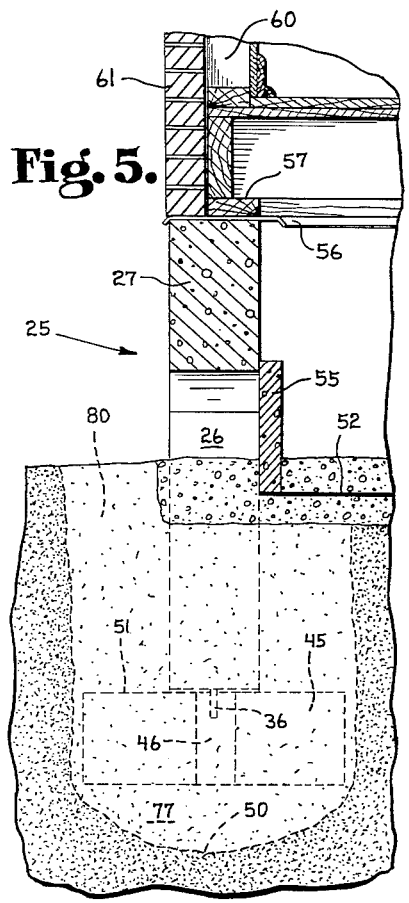
FIG. 5 is a vertical section through a building construction including the foundation of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a foundation 20 which includes a plurality of footing 21 submerged beneath the ground. Supported upon the footings 21 is a plurality of L-shaped reinforced-concrete post-and-lintel members 22, a representative one 25 of which is shown in detail in FIGS. 2–4.

Referring to FIG. 2, it can be seen that the member 25 includes a shorter leg 26 and a longer leg 27, the two legs being perpendicular to and integral with one another.

As mentioned, the member 25 is composed of reinforced concrete including reinforcing steel bars 28 and 30. The steel bar 28 extends adjacent the outside surface 31 of the longer leg 27 for a substantial portion of the length of the longer leg and also extends into the shorter leg 26 adjacent the outside surface 32 thereof to project from the distal surface 35 of the shorter leg at 36. It will be noted that the portion 29 of the steel bar 28 is positioned approximately halfway between the surface 32 of leg 26 and the center of the leg. The two reinforcing bars 30 extend substantially the complete length of the longer leg 27 adjacent the inside surface 37 thereof.

Also embedded within the concrete of the L-shaped member 25 is a vertical pin 40 which projects from a recess 41 at the junction of the longer and shorter legs 26 and 27. At the distal end of the longer leg 27, there is provided a pair of square shaped, downwardly projecting portions 42 separated by a groove extending completely across the end of the longer leg 27. When the member 25 is assembled in a foundation as shown for the members 22 of FIG. 1, the projections 42 extend into the recess 41 of an adjacent member similar to the member 25. When the projections 42 are received within the recess 41 of an adjacent L-shaped member, the pin 40 of the adjacent member projects into the recess 45. In order to complete the connection, cement grout, or bonding agent, is placed within the recess 45 surrounding the pin 40 of the adjacent member.

The dimensions of the knee brace 49 are variable depending upon design requirements.

FIG. 5 shows the relationship between a cylindrical disc footing 45 and the member 25 which is shown as a part of the completed foundation and building construction. The projecting portion 36 of the reinforcing bar 28 extends into a cylindrical aperture 46 within the disc 45. FIG. 5 illustrates the fact that it is only necessary to dig a hole 50 large enough and deep enough to receive the footing disc 45. The leg 26 is supported upon the upper flat surface 51 of the disc 45 after a portion of cement grout has been thrown into the aperture 46. The construction illustrated in FIG. 5 also includes a vapor barrier 52, a face slab 55, termite shield 56, a wood joist system 57, a stud wall 60 and an outside covering of brick 61.

The air space 62 between the leg 27 and ground 63 permits freezing and thawing of the ground without resulting forces on the leg 27.

Figure 5A:
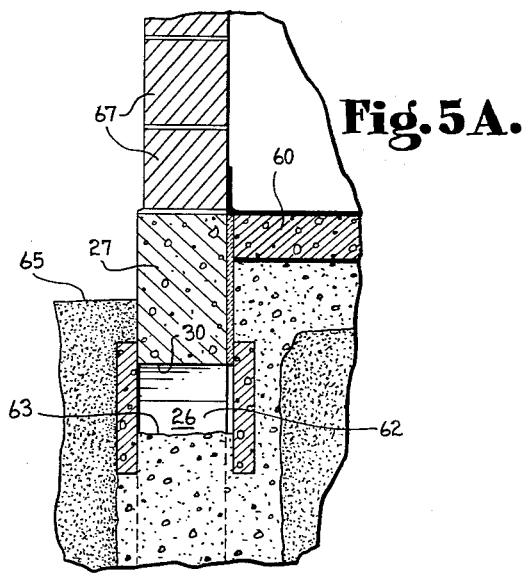
FIG. 5A is a view similar to FIG. 5 of an alternative type of building construction usable with the present invention.

FIG. 5A illustrates a construction identical to that of FIG. 5 with the exception that the horizontal leg 27 of the member 25 has its inside surface 30 positioned beneath the ground level 65 so that the leg 27 gives the appearance identical to a standard foundation. Instead of the crawl space arrangement of FIG. 5, the building construction of FIG. 5A includes a concrete slab 66 and concrete block wall 67. Even though the structure of FIG. 5A gives the appearance of a standard foundation, it is not necessary to engage in the extensive digging connected with a standard foundation to construct the arrangement of FIG. 5A.

Figure 6:
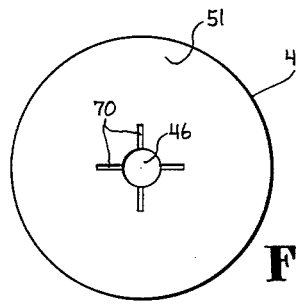
FIG. 6 is a top plan view of the footing making up a part of the structure of FIG. 5.
Figure 7:
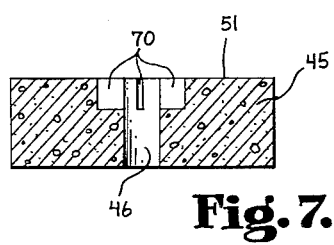
FIG. 7 is an axial section of the structure of FIG. 6.

FIGS. 6 and 7 illustrate the details of the footing disc 45. Extending from the upper surface 51 of the disc into the disc is a plurality of radially extending recesses 70 which receive the flanges 71 of a tool 72 used for rotating or augering the disc 45 to correctly position it. As illustrated in FIG. 10, the tool 72 is provided with a lever 75 secured to a vertical cylindrical portion 76 which is inserted within the aperture 46. When the hole 50 is dug to receive the disc 45, a certain amount 77 of the dirt is removed and then replaced in the hole to permit adjustment of the position of the disc. After the disc has been properly positioned and the post 26 of the member 25 has been supported upon the disc, the remaining portion 80 of the dirt is returned to the hole. The disc of FIGS. 6 and 7 may be poured in place or may be poured at a separate location.

Figure 8:
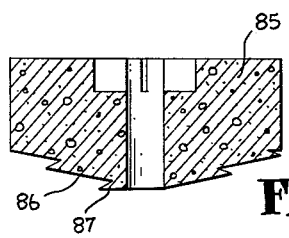
FIG. 8 is a section similar to FIG. 7 of an alternative footing usable in the present invention.
Figure 9:
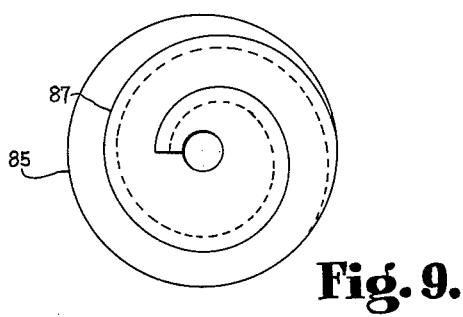
FIG. 9 is a bottom plan view of the structure of FIG. 8.

In FIGS. 8 and 9, there is illustrated an alternative form of footing disc 85 which is identical to the disc 45 with the exception that the lower surface 86 of the disc 85 has a tapering configuration with a spiral thread 87. The thread 87 assists in properly locating the disc 85 within the hole 50. For example, if the disc is not at a sufficiently low level, the disc 85 can be rotated by the tool 72 causing the spiral thread 87 to drill into the dirt 77 and to lower the disc in the hole. This disc also may be poured in place or at a separate location.

A further alternative form of footing illustrated in FIG. 17 will be described below.

Referring now to FIG. 11, in a certain portion of the foundation 20, it is necessary to connect three lintels, for example, at the location 100 of FIG. 1. This connection is accomplished in the manner illustrated in FIGS. 11 and 12. The member 101 of FIGS. 11 and 12 is identical to the member 25 of FIG. 2 with the exception that the post or vertical portion 102 of the member is stouter or thicker. For example, the post 26 of FIG. 2 might have dimensions of 8" x 12" in cross section while the post 102 of FIGS. 11 and 12 would have dimensions of 12" x 12" in cross section. The lintel portion or longer portion 27 of the member 25 is hooked into a recess 105 which is perpendicular to and intersects a recess 106. The recesses 105 and 106 are defined by raised portions 107 and 110 which are also perpendicular to and intersect one another.

In FIG. 14, a four-lintel connection such as would be required at 115 in FIG. 1 is illustrated. FIG. 15 is a top plan view of a member 116 which has a post 117 having a cross sectional dimension of 12" x 16". The construction of FIGS. 14 and 15 is similar or identical to the construction of FIGS. 11 and 12 with the exception that the post 117 is provided with three connected recesses 120 defined by the raised portions 121 of the post.

FIG. 16 illustrates a method of providing footings for the L-shaped post-and-lintel members of the present invention. This method comprises the jetting of water through apertures 125 extending through the post or shorter arm 126 of an L-shaped member 127. The member 127 is supported at its center of gravity by a lifting device 130. The distal end 131 of the longer arm 132 of the member 127 is engaged within or positioned above a recess 135 similar to the recess 41 of FIG. 2.

A hose 136 capable of supplying water under pressure is inserted into the upper ends 137 of the apertures 125. Thus, water is caused to flow through the apertures and to flush out the silt and dirt 140 adjacent the lower end of the leg 126 and on the bottom of the lake or body of water 141, it being noted that the leg 126 projects beneath the upper surface 142 of the water. After all the loose silt and dirt has been washed away from the lower end of the post 126, the hose 136 is removed and replaced by a hose carrying concrete or cement which is forced through the apertures 125 to produce the structure illustrated in the right side of FIG. 16. Alternatively and preferably, a single hose is used to provide both the water and concrete whereby disconnecting and reconnecting of hose is eliminated. Of course, before placing the concrete through the apertures 125, the projection 145 is seated within the recess 135 and the lintel portion 132 is aligned with the lintel portion 150 of the adjacent L-shaped member 151. After the concrete has been forced through the apertures 125, it fills the hole which has been created by the washing away of the dirt and silt and produces a footing similar to the footing 152 of FIG. 16.

The member 200 of FIG. 17 may be positioned in the bottom of the lake or other body of water in a fashion much like the process illustrated in FIG. 16. The member 200 of FIG. 17 has a screw thread 201 on its external surface and may function as a footing itself. The member 200 is positioned by rotating the member and by simultaneously jetting water through the apertures 202 to wash out dirt and silt to assist in the positioning of the member, the apertures 202 being equally spaced about and parallel to the axis of the member 200. Alternatively the member 200 might be driven or vibrated into to soil. Also, other liquids other than water might be used to lubricate. In one manner of using the member 200, there are no further steps necessary. In other words, the member acts as a footing.

The member 200 might also be used as a post or pier in relatively fluid ground away from a body of water. In such an application, the water is jetted through the passage 202 and the member 200 is screwed into position. Concrete or cement is then moved under pressure through the apertures 202 to form the ball of concrete 203. Such a process provides an extremely rigid foundation in relatively fluid uncertain ground.

From the above description, it will be evident that the present invention provides improved building construction which eliminates the necessity of digging through a large amount of ground in order to construct a foundation. It will also be evident that the present invention provides an improved method of installing footings above and below water. It should also be mentioned that the present invention provides means for constructing buildings many floors in height. Thus, the L-shaped members could be used in addition to their use in the foundation to provide wall and ceiling supports connected in much the same manner as described above in connection with the foundation.

As used in the present specification and claims, the terminology "building construction" is intended to mean bridges, retaining walls, piers, docks, etc.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected. For example L-shaped members having legs at other than 90° are included in the invention, one example being a truss and post or a truss and pier combination.

All concrete poured or formed shall be engineered to conform with good engineering practice; steel location and/or amounts thereof may be altered to conform with existing codes and/or local regulatory statutes:

Also, the above mentioned post and lintel arrangement may have an oval, rectangular or other shaped cross section.

The invention claimed is:

Building construction comprising footings having a round flat disc shape and submerged beneath the ground, said footings having elongated apertures extending downwardly from their upper flat surfaces, L shaped members of reinforced concrete each having two integral legs perpendicular to one another, one leg of said L shaped member having a vertical metallic pin extending from the bottom thereof and received and secured in the aperture in said footing, said leg extending vertically and acting as a post, the other leg of each L shaped member extending horizontally and acting as a beam, each L shaped member having an upwardly opening recess at the juncture of said two legs, the beam having a downwardly extending projection at one end, said projection having a shape complementary to said upwardly opening recess, said projection being received in and secured to an adjacent L shaped member in the recess thereof, whereby a plurality of said L shaped members secured together form the complete building frame structure.

References Cited by the Examiner

UNITED STATES PATENTS

| | | | |
|---|---|---|---|
| 960,305 | 6/1910 | Gilbreth | 52—723 |
| 1,449,236 | 3/1923 | Malone | 61—53.6 |
| 1,527,684 | 2/1925 | Hull | 52—574 |
| 2,037,482 | 4/1936 | Oliver | 52—236 |
| 2,554,896 | 5/1951 | Caudill | 61—53.6 |
| 2,720,105 | 10/1955 | Billups | 52—594 |
| 2,779,161 | 1/1957 | Pickman | 61—53.6 |
| 3,063,202 | 11/1962 | Carper | 52—436 |
| 3,074,240 | 1/1963 | Elliott | 61—53.6 |
| 3,106,045 | 10/1963 | Rautio | 52—169 |
| 3,108,403 | 10/1963 | Jackson | 52—169 |
| 3,137,098 | 6/1964 | Elia et al. | 52—170 |
| 3,151,464 | 10/1964 | Schuichiro Sato et al. | 61—53.58 |
| 3,152,450 | 10/1964 | Muller | 61—53.58 |

FOREIGN PATENTS

| | | |
|---|---|---|
| 533,118 | 11/1930 | France. |
| 1,157,406 | 12/1957 | France. |
| 545,759 | 6/1942 | Great Britain. |
| 559,237 | 2/1944 | Great Britain. |
| 185,619 | 10/1936 | Switzerland. |

FRANK L. ABBOTT, *Primary Examiner.*

HENRY C. SUTHERLAND, *Examiner.*

M. O. WARNECKE, *Assistant Examiner.*